US012417785B1

(12) United States Patent
Tomoda et al.

(10) Patent No.: US 12,417,785 B1
(45) Date of Patent: Sep. 16, 2025

(54) MAGNETIC DISK APPARATUS AND METHOD

(71) Applicants: Kabushiki Kaisha Toshiba, Tokyo (JP); Toshiba Electronic Devices & Storage Corporation, Tokyo (JP)

(72) Inventors: Yusuke Tomoda, Yokohama Kanagawa (JP); Takayuki Kawabe, Sagamihara Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/911,755

(22) Filed: Oct. 10, 2024

(30) Foreign Application Priority Data

Jun. 27, 2024 (JP) ................................ 2024-103778

(51) Int. Cl.
*G11B 5/596* (2006.01)
*G11B 27/36* (2006.01)

(52) U.S. Cl.
CPC ...... *G11B 5/59672* (2013.01); *G11B 5/59638* (2013.01); *G11B 27/36* (2013.01)

(58) Field of Classification Search
CPC ... G11B 5/54; G11B 5/59633; G11B 5/59638; G11B 5/56; G11B 5/58; G11B 5/588; G11B 5/52
USPC ................................................. 360/75, 77.06
See application file for complete search history.

(56) References Cited

U.S. PATENT DOCUMENTS

| 7,430,092 | B2 | 9/2008 | Abe et al. |
| 8,908,311 | B1 | 12/2014 | Vasquez |
| 10,748,567 | B1 | 8/2020 | Zaitsu et al. |
| 12,230,297 | B2 * | 2/2025 | Maeto ................ G11B 5/5556 |
| 2023/0260540 | A1 | 8/2023 | Maeto |

FOREIGN PATENT DOCUMENTS

JP 2023-119547 A 8/2023

* cited by examiner

*Primary Examiner* — Nabil Z Hindi
(74) *Attorney, Agent, or Firm* — Kim & Stewart LLP (57) ABSTRACT

According to an embodiment, a controller executes a determination operation when a magnetic head passes over a servo sector during a write operation. In the determination operation, a first cumulative amount is calculated by accumulating, for a first section, evaluation amounts each corresponding to an amount by which the width of an adjacent track is narrowed due to the write operation, and determination is made as to whether the first cumulative amount is smaller or larger than a threshold value corresponding to a limit of error correction. When the first cumulative amount is determined to be larger than the threshold value, the controller interrupts the write operation and re-executes the determination operation after executing a rotational delay. The controller resumes the write operation when the first cumulative amount is determined to be smaller than the threshold value as a result of the re-executed determination operation.

20 Claims, 8 Drawing Sheets

MAGNETIC DISK APPARATUS AND METHOD

CROSS-REFERENCE TO RELATED APPLICATIONS

This application is based upon and claims the benefit of priority from Japanese Patent Application No. 2024-103778, filed on Jun. 27, 2024; the entire contents of which are incorporated herein by reference.

FIELD

An embodiment described herein relates generally to a magnetic disk apparatus and method.

BACKGROUND

There is a magnetic disk apparatuses having a function to protect, for each track, data that has been written to tracks. According to this function, the magnetic disk apparatus can generate an error correction code for each track and perform error correction on each track by using the error correction code. Error correction performed on each track is referred to as track error correction.

The magnetic disk apparatus having the function of track error correction monitors the position of a magnetic head during execution of a write operation. In a case where there is a possibility that data stored in an adjacent track cannot be corrected even by the track error correction due to writing to a write target track, the magnetic disk apparatus interrupts the write operation and executes a predetermined operation.

DETAILED DESCRIPTION

According to the present embodiment, a magnetic disk apparatus includes a magnetic disk, a magnetic head, and a controller. The magnetic disk includes tracks on which multiple servo sectors storing servo information are arranged at intervals in a circumferential direction. The multiple servo sectors include a first track and a second track adjacent to the first track in a radial direction. The second track is subjected to writing before the first track is. The first track and the second track each include data sectors. The data sectors include a data sector in which an error correction code is stored to perform error correction on the corresponding first or second track. The magnetic head is configured to write data and read data to and from the magnetic disk. The controller is configured to read servo information when the magnetic head passes over each of the multiple servo sectors and execute, based on the read servo information, a write operation on the first track while executing positioning of the magnetic head on the first track. The controller is configured to execute, during the write operation, a determination operation when the magnetic head passes over a first servo sector being one of the multiple servo sectors. The determination operation is executed by: calculating a first cumulative amount obtained by accumulating, for a first section, evaluation amounts each corresponding to an amount by which a width of the second track is narrowed due to the write operation, and determining whether the first cumulative amount is smaller or larger than a first threshold value corresponding to a correction limit of the error correction. The first section includes a second section and a third section. The second section is a section in which writing of data in a circumferential direction of the first track is completed. The third section is a section in which data is written subsequent to the second section in the circumferential direction of the first track. The controller is configured to interrupt the write operation in response to determining, by the determination operation, that the first cumulative amount is larger than the first threshold value. The controller is configured to execute, after the write operation is interrupted, a rotational delay of the magnetic disk and re-execute the determination operation when the magnetic head passes over the first servo sector again. The controller is configured to resume the write operation in response to determining, by the re-executed determination operation, that the first cumulative amount is smaller than the first threshold value.

Hereinafter, a magnetic disk apparatus and method according to the embodiment will be described in detail with reference to the accompanying drawings. Note that the present invention is not limited by the embodiment.

Embodiment

Figure 1:
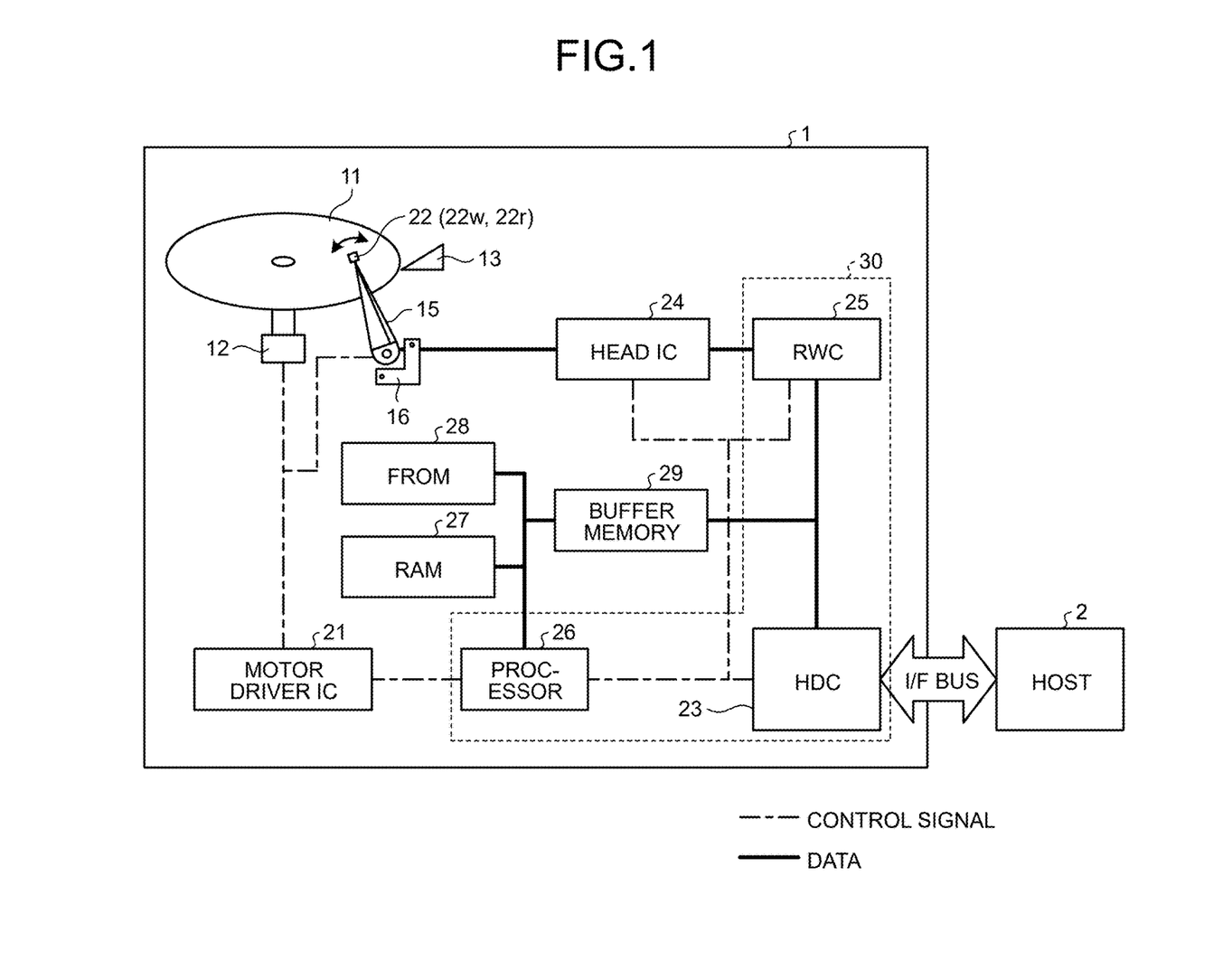
FIG. 1 is a schematic diagram illustrating an exemplary configuration of a magnetic disk apparatus according to an embodiment.

FIG. 1 is a schematic diagram illustrating an exemplary configuration of a magnetic disk apparatus 1 according to an embodiment.

The magnetic disk apparatus 1 is connected to a host 2. The magnetic disk apparatus 1 can receive an access command such as a write command or a read command from the host 2.

The magnetic disk apparatus 1 includes a magnetic disk 11 on which a recording surface is provided. The magnetic disk apparatus 1 writes and reads data to and from the magnetic disk 11 (more precisely, the recording surface of the magnetic disk 11) in response to an access command. Although the magnetic disk apparatus 1 can include a plurality of magnetic disks 11, the magnetic disk apparatus 1 in the embodiment includes one magnetic disk 11 for the sake of simplicity of description and illustration.

Data is written and read via a magnetic head 22. Specifically, in addition to the magnetic disk 11, the magnetic disk apparatus 1 includes a spindle motor 12, a motor driver integrated circuit (IC) 21, the magnetic head 22, an actuator arm 15, a voice coil motor (VCM) 16, a ramp 13, a head IC 24, a read and write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21.

The motor driver IC 21 controls the rotation of the spindle motor 12 and the rotation of the VCM 16.

The magnetic head 22 writes data and reads data to and from the magnetic disk 11 by a write element 22*w* and a read element 22*r*. The magnetic head 22 is attached to the tip of the actuator arm 15. The magnetic head 22 is moved in the radial direction of the magnetic disk 11 by the VCM 16 driven by the motor driver IC 21.

In cases like when the rotation of the magnetic disk 11 is stopped, the magnetic head 22 is moved onto the ramp 13. The ramp 13 holds the magnetic head 22 at a position spaced apart from the magnetic disk 11.

The head IC 24 amplifies and outputs a signal read from the magnetic disk 11 by the magnetic head 22 at the time of reading and supplies the signal to the RWC 25. In addition, the head IC 24 amplifies a signal corresponding to data to be written that is supplied from the RWC 25 and supplies the amplified signal to the magnetic head 22 at the time of a write operation.

The HDC 23 performs control of transmission and reception of data to and from the host 2 via an I/F bus, control of the buffer memory 29, and others.

The buffer memory 29 serves as a buffer for data transmitted to and received from the host 2. The buffer memory 29 serves to, for example, temporarily store data to be written to the magnetic disk 11 or data read from the magnetic disk 11.

The buffer memory 29 is implemented by, for example, a volatile memory capable of high-speed operations. The type of the memory as the buffer memory 29 is not limited to a specific type. The buffer memory 29 may be implemented by, for example, a dynamic random access memory (DRAM), a static random access memory (SRAM), or a combination of these memories.

The RWC 25 performs modulation including error correction coding on data to be written, which is supplied from the HDC 23, and supplies the modulated data to the head IC 24. In addition, the RWC 25 performs demodulation including error correction and the like on a signal read from the magnetic disk 11 and supplied from the head IC 24, and outputs to the HDC 23 digital data obtained by the demodulation.

In one example, the processor 26 is a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and others. Note that the firmware may be stored in the magnetic disk 11.

The RAM 27 is implemented by, for example, a DRAM, an SRAM, or a combination of these memories. The RAM 27 serves as an operation memory by the processor 26. The RAM 27 serves as an area in which the firmware is loaded or an area in which various types of management data are held.

The processor 26 performs overall control of the magnetic disk apparatus 1 in accordance with the firmware stored in the FROM 28 or the magnetic disk 11. The processor 26 loads the firmware from the FROM 28 or the magnetic disk 11 to the RAM 27 and executes control of the motor driver IC 21, the head IC 24, the RWC 25, the HDC 23, and others in accordance with the loaded firmware.

Note that a configuration including the RWC 25, the processor 26, and the HDC 23 can also be regarded as a controller 30. The controller 30 may be configured as a system-on-a-chip (SoC). The controller 30 is not necessarily configured as a SoC.

In addition to these components, the controller 30 may include other components (such as the RAM 27, the FROM 28, the buffer memory 29, or the RWC 25).

Figure 2:
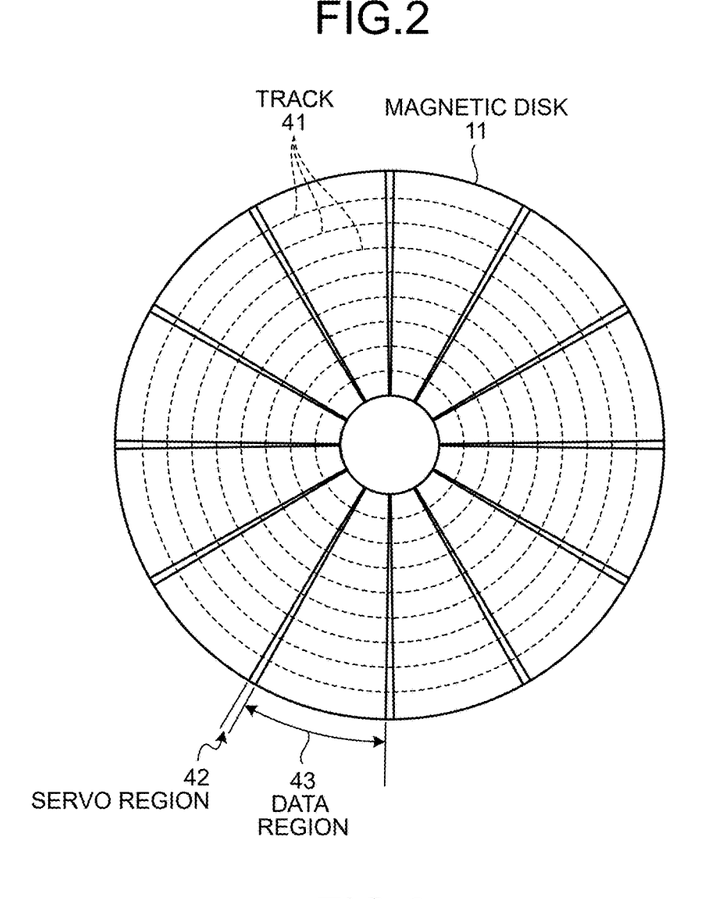
FIG. 2 is a schematic diagram illustrating an exemplary configuration of a magnetic disk according to the embodiment.

FIG. 2 is a schematic diagram illustrating an exemplary configuration of the magnetic disk 11 according to the embodiment.

Servo information is written to the magnetic disk 11 by, for example, a servo writer or self-servo write (SSW) in the manufacturing process. Illustrated in FIG. 2 are servo regions 42 that are radially arranged as an example of arrangement of servo regions where the servo information is written. Each data region 43 to which data can be written is provided between the servo regions 42.

A plurality of concentric tracks 41 is provided in the radial direction of the magnetic disk 11 on the basis of the servo information. Data sectors in which data is written are arranged in the data regions 43 provided along the tracks 41.

The servo information includes a servo mark, a gray code, a burst pattern, and a post code. When writing data to a data sector or reading data from a data sector, the controller 30 generates a positional error signal (PES) on the basis of servo information read from a servo region 42 by the magnetic head 22. The PES represents an amount of deviation from the center of a target track. The controller 30 executes positioning of the magnetic head 22, namely, seek control and tracking control on the basis of a PES acquired each time when the magnetic head 22 passes over a servo region 42.

Hereinafter, portions of the tracks 41 divided by the servo regions 42 are referred to as servo sectors. Since the servo regions 42 are radially arranged, it may be thought that servo sectors are arranged at intervals in the circumferential direction on each track 41.

Hereinafter, data that is written to each data sector is referred to as a data piece.

As methods of writing data on a magnetic disk, a method called shingled magnetic recording (SMR) and a method called conventional magnetic recording (CMR) have been known.

Figure 3:
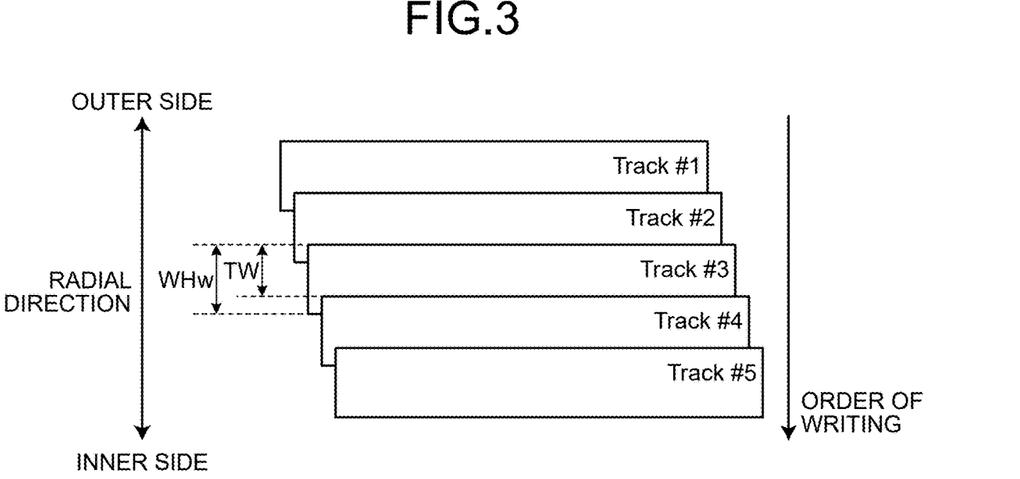
FIG. 3 is a schematic diagram for describing an SMR method applied to the magnetic disk apparatus of the modification.

FIG. 3 is a schematic diagram for describing an SMR method applied to the magnetic disk apparatus 1 of the embodiment. In the SMR method, in a case where writing of data (referred to as first data) of a track 41 is executed, and then writing of data (referred to as second data) of a track 41 radially adjacent to the above-described track 41 is executed, these tracks 41 are arranged such that the second data overlaps with part of the first data. Thus, according to the SMR method, data of one track 41 out of the two tracks 41 adjacent to each other in the radial direction of the magnetic disk 11 is written in a superimposed manner on part of data of the other track of the two tracks 41.

In FIG. 3, data of track #2 is written so as to overlap with part of data of track #1 that has already been written. Likewise, data of track #3 is written so as to overlap with part of data of track #2 that has already been written. Thus, according to the SMR method, data of one track overlaps with part of data of an adjacent track that has already been written, which is repeatedly performed.

As a result, each track width TW is made narrower than the width (WHw) of the write element 22w, and the recording density is improved.

However, according to the SMR method, the track width TW is narrower than the width WHw of the write element 22w. Therefore, updating of part of data in multiple tracks results in destroying data of a track adjacent to a track of the updated data. In order to prevent such data destruction, data of the multiple tracks including part of the data to be originally updated is collectively updated. A region of the multiple tracks where data is collectively updated is referred to as a band.

Additionally, according to the SMR method, it is also specified that writing can be executed on a plurality of tracks 41 in one band only from predetermined one of the outer side end and the inner side end of the magnetic disk 11 toward the other predetermined end. In the example illustrated in FIG. 3, writing is executed for each track 41 from the outer side end toward the inner side end. The controller 30 may execute writing for each track 41 from the inner side end toward the outer side end. In addition, the order of writing may be set separately for each band.

In the following description, it is presumed that track numbers corresponding to the arrangement order in the radial direction are given to tracks 41 included in a band region 130 and that writing is executed track 41 by track 41 in the order of track numbers in the SMR method.

In the CMR method, data of two tracks 41 adjacent to each other in the radial direction of the magnetic disk 11 is written so as not to overlap with each other. According to the CMR method, the width of each of the tracks 41 is the same as the width (WHw) of the write element 22w. Therefore, data at an optional position can be updated. According to the CMR method, the recording density is lower than that in the SMR method, whereas high random access performance can be achieved.

The controller 30 of the embodiment is configured to write data received from the host 2 to the magnetic disk 11 by the SMR method. Therefore, the magnetic disk 11 is provided with a plurality of band regions.

Figure 4:
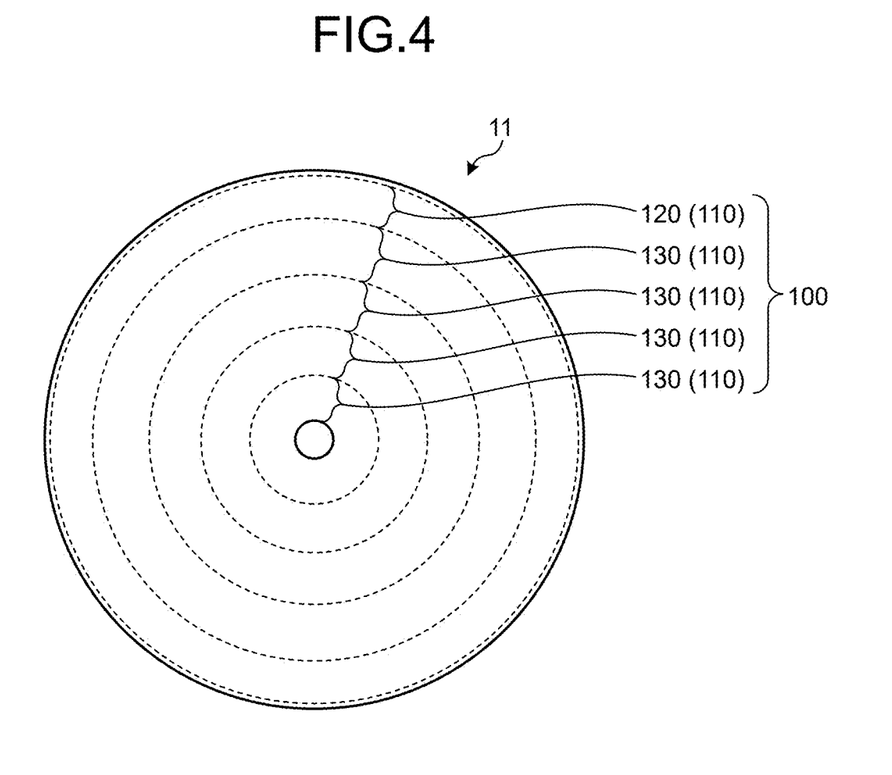
FIG. 4 is a diagram illustrating an example of band regions provided on the magnetic disk according to the embodiment.

FIG. 4 is a diagram illustrating an example of such a plurality of band regions provided on the magnetic disk 11 according to the embodiment.

The recording surface 100 of the magnetic disk 11, namely, a region where the tracks 41 can be arranged, is divided into a plurality of recording regions 110 in the radial direction. The recording regions 110 include a media cache region 120 and multiple band regions 130. A region called a guard region that cannot be designated as a write destination from the host 2 is provided between recording regions 110. Note that guard regions are not illustrated in FIG. 4.

The recording region 110 provided on the outermost side in the radial direction on the recording surface 100 is set as the media cache region 120. The media cache region 120 is a recording region serving as a temporary storage location of data. Note that the position of the media cache region 120 is not limited to the outermost side. Two or more media cache regions 120 may be provided on the recording surface. Data can be written to the media cache region 120 by the CMR method.

One or more of the recording regions 110 are set as band regions 130. Each of the band regions 130 is provided with a plurality of tracks 41. The maximum amount of user data written in each of the band regions 130, namely, the storage capacity of each band region 130 is common to all the band regions 130. In each of the band regions 130, data is written by the SMR method to all the tracks 41. When data is written to each of the band regions 130, it is prohibited to write data to an adjacent band region 130 beyond a guard region from a band region 130 as the write destination.

Note that part of the band regions 130 may be configured such that data is written by the CMR method.

When a write operation on one track 41 is executed, the magnetic head 22 may vibrate due to an external factor. In a case where the magnetic head 22 is shifted toward a track 41 (referred to as an adjacent track), which is adjacent to a write target track 41 and is written to before the write target track 41 is, the width of the adjacent track is narrowed by the amount of deviation of the magnetic head 22 toward the adjacent track. The amount of the width of the adjacent track reduced by deviation of the magnetic head 22 toward the adjacent track is referred to as a narrowed amount. The narrowed amount is an amount of deviation of the magnetic head 22 from the center of the write target track 41 toward the adjacent track. In a case where the narrowed amount is larger than a predetermined amount, interference of the magnetic field of the magnetic head 22 with data written in the adjacent track may cause the data to be lost. Moreover, according to the SMR method, the track width TW is narrower than that of the CMR method or the like. Therefore, the data of the adjacent track is greatly affected by vibration of the magnetic head 22.

Considering the above, the controller 30 of the embodiment has a function to correct a track error. According this function, even if data pieces written in some data sectors of adjacent tracks are lost due to the vibration of the magnetic head 22, the data pieces can be restored by error correction.

Figure 5:
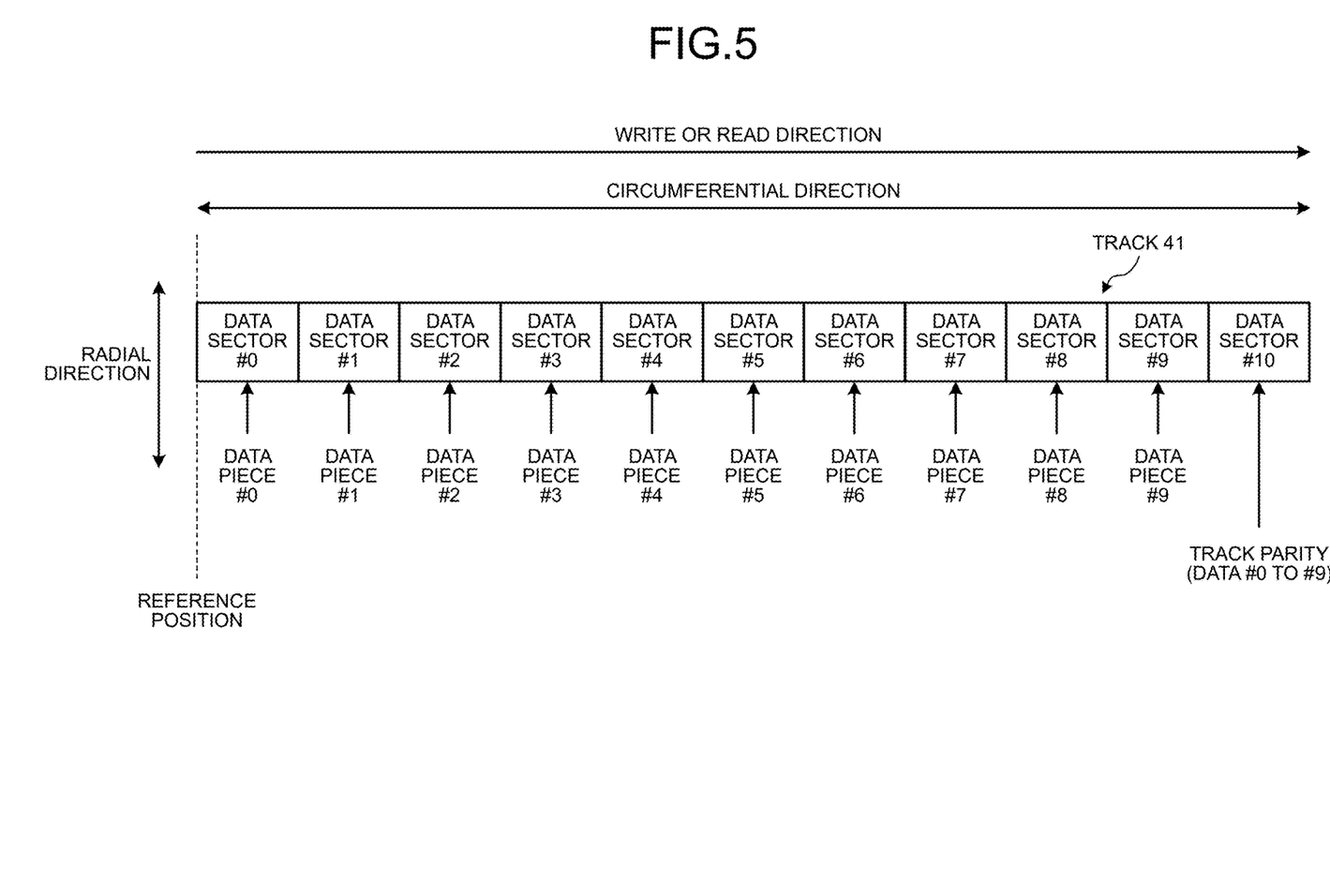
FIG. 5 is a diagram for describing track error correction of the embodiment.

FIG. 5 is a diagram for describing track error correction of the embodiment. In the drawing, the structure of one track 41 is illustrated, and illustration of servo sectors is omitted. The write or read direction is illustrated in the drawing. The write or read direction is a direction in which the magnetic head 22 moves relatively to a track 41 by rotation of the magnetic disk 11. The magnetic head 22 writes or reads data in the write or read direction with respect to each track 41.

Each data sector provided in the track 41 is identified by a sector number. A data sector whose sector number is x is referred to as a data sector #x. In the example illustrated in FIG. 5, the track 41 includes eleven (11) data sectors from a data sector #0 to a data sector #10.

A data piece that is scheduled to be written to the data sector #x and a data piece that has been written to the data sector #x are referred to as a data piece #x.

In the circumferential direction, the eleven data sectors are arrayed in the order of sector numbers from a reference position in the write or read direction. In this specification, the head and the tail are defined on the basis of the reference position and the write or read direction.

A track head refers to the position where the magnetic head 22 initially passes over in a section from when the magnetic head 22 passes over the reference point to when the magnetic head 22 passes over the next reference point. A track tail is refers to the position where the magnetic head 22 passes over last in the section from when the magnetic head 22 passes over the reference point to when the magnetic head 22 passes over the next reference point. Among the data sectors #0 to #10 illustrated in FIG. 5, a data sector located at the track head, namely, the data sector #0 is referred to as a head data sector, and a data sector located at the track tail, namely, the data sector #10 is referred to as a tail data sector.

The tail data sector #10 is a data sector for storing parity bits (hereinafter, simply referred to as parity) that is an error correction code for track error correction. Writing for each track 41 can be executed as follows. First, data pieces are written to the data sectors #0 to #9 in order of the sector numbers. In the data sector #10 at the tail of the track 41, parity that is calculated based on a group of data pieces written in the data sectors #0 to #9 is written.

The parity written in the data sector #10 protects the group of data pieces written in the data sectors #0 to #9 from occurrence of an error. Thus, the parity written in the data sector #10 protects data of the corresponding track 41. The parity written in the data sector #10 at the tail of the track 41 is referred to as a track parity. A data sector in which the track parity is stored, such as the data sector #10, may be referred to as a parity sector.

Note that a method of calculating the track parity is not limited to a specific method. In one example, the track parity is generated by executing XOR for each bit position on a group of data pieces written in the data sectors #0 to #9.

In this manner, each track 41 is provided with multiple data sectors including a parity sector. Note that the number of parity sectors in each track 41 is not limited to one. In one example, two parity sectors may be provided in each track 41. In this case, for example, one of the two parity sectors stores parity, which is generated from a group of data pieces written in data sectors located at even-numbered positions from the track head. Then, the other one of the two parity sectors stores parity, which is generated from a group of data pieces written in data sectors located at odd-numbered positions from the track head. Alternatively, each track 41 may include three or more parity sectors.

During the write operation, the controller 30 estimates whether or not a track error occurs due to continuation of the write operation. A track error corresponds to a state where data of an adjacent track cannot be corrected even by track error correction. When it is estimated that a track error occurs due to continuation of a write operation, the controller 30 interrupts the write operation and executes a predetermined operation. The predetermined operation includes a partial track slip (PTS) operation.

Figure 6:
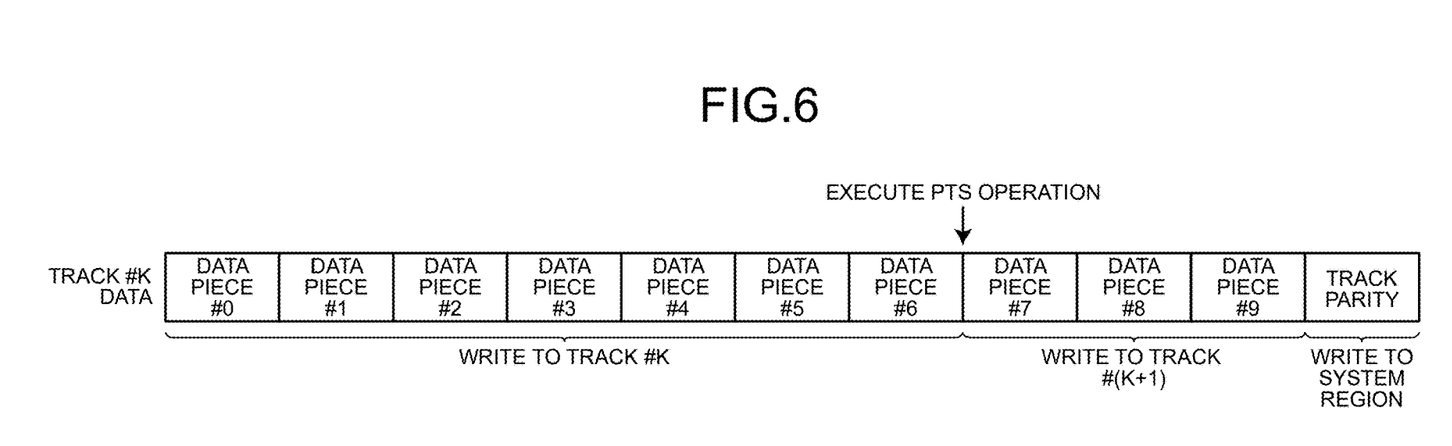
FIG. 6 is a diagram for describing a PTS operation according to the embodiment.

FIG. 6 is a diagram for describing the PTS operation according to the embodiment. In the drawing, data pieces #0 to #9 and a track parity are illustrated as data for one track to be written to a track #K that is a track 41 whose track number is K. The data for one track is referred to as "track #K data". Note that, in a read operation with respect to the track #K, a track #(K−1) corresponds to the adjacent track of the track #K.

In a write operation of writing the track #K data to the track #K, when it is estimated that a track error occurs at the timing when writing of the data piece #6 is completed, the controller 30 immediately stops the write operation and executes the PTS operation.

In the PTS operation, the controller 30 writes, to a system region (not illustrated), the track parity of the track #K data. The system region is provided at a position different from the band region 130 where user data is written. The system region may be provided in the magnetic disk 11 or may be provided in a nonvolatile memory such as the FROM 28. Moreover, data pieces #7 to #9, which are data pieces not yet written to the track #K among the track #K data, are written to a track #(K+1). For example, the controller 30 writes the data pieces #7 to #9 in data sectors #0 to #2 of the track #(K+1).

Note that, as long as the data pieces and the track parity not yet written to the track #K among the track #K data are written to positions different from the track #K, the write destination of these pieces of information is not limited to the positions exemplified above.

Occurrence of a track error is determined by the length of a section in the circumferential direction in which writing is performed in a state where the narrowed amount exceeds a predetermined threshold value (referred to as a threshold narrowed amount) and an amount by which the narrowed amount exceeds the threshold narrowed amount. Therefore, the controller 30 estimates whether or not a track error occurs by a determination operation based on the length of the section in the circumferential direction in which writing is performed in a state where the narrowed amount exceeds the threshold narrowed amount and the amount by which the narrowed amount exceeds the threshold narrowed amount. This determination operation is referred to as a track error estimation operation.

The threshold narrowed amount is larger than or equal to 0 and is less than or equal to a design value of the track width. The threshold narrowed amount is determined by a designer. In one example, an upper limit value of the threshold narrowed amount with which a data piece written in an adjacent track can be normally read without using the track error correction is determined as the threshold narrowed amount. A method for determining the threshold narrowed amount is not limited to the above. A value obtained by subtracting a predetermined value from the upper limit value may be set as the threshold narrowed amount.

Figure 7:
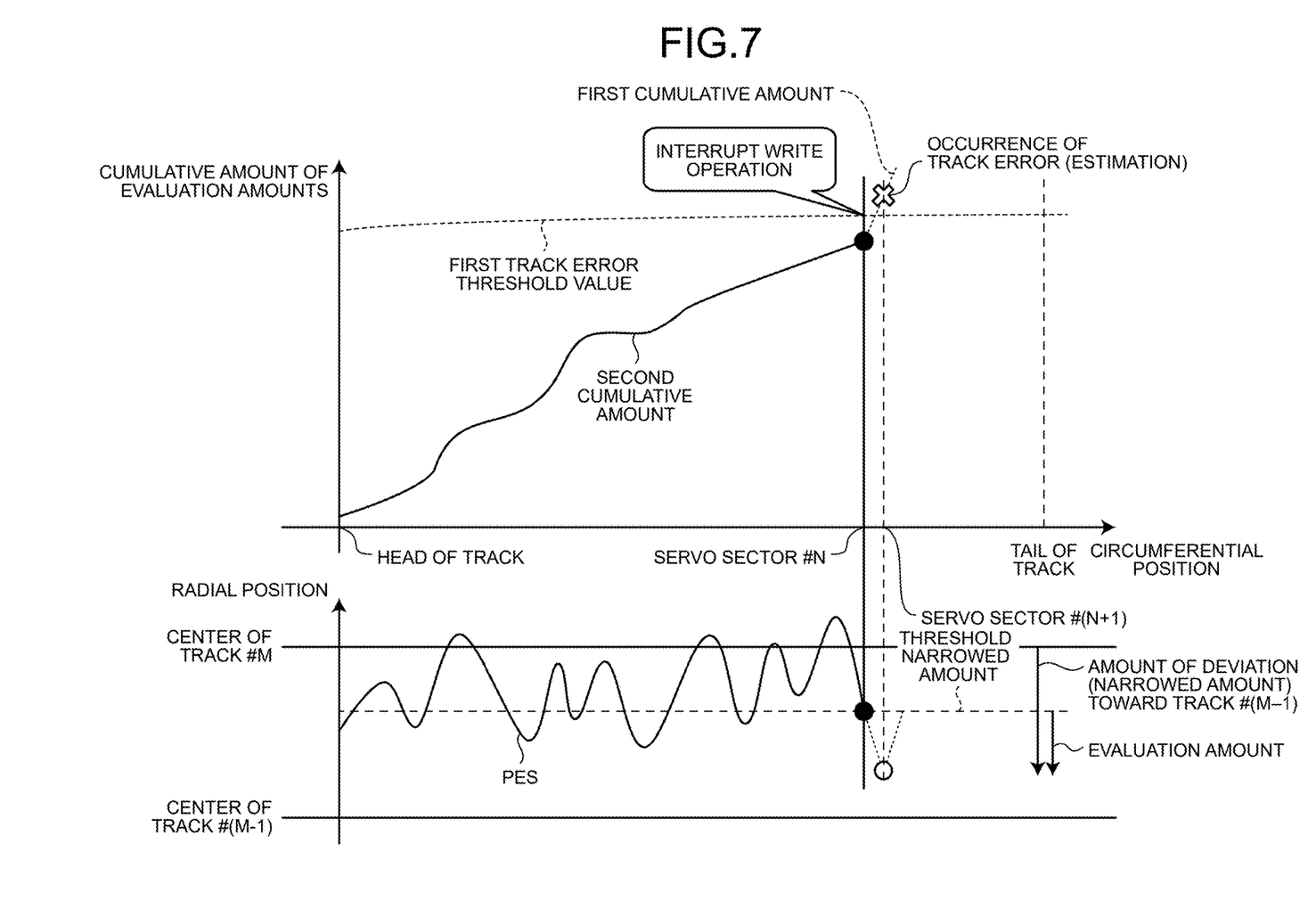
FIG. 7 is a diagram for describing a track error estimation operation according to the embodiment.

FIG. 7 is a diagram for describing a track error estimation operation according to the embodiment;

The track error estimation operation is executed every time when the magnetic head 22 passes over a servo sector during the write operation. In FIG. 7, description will be given on a track error estimation operation performed when a write operation on a track #M is executed and the magnetic head 22 reaches a servo sector #N. Note that, at a point when the write operation on the track #M is performed, writing to a track #(M−1), which is an adjacent track, is completed.

The controller 30 executes the write operation with respect to the track #M while positioning the magnetic head 22 on the track #M. The controller 30 sets an amount by which the narrowed amount (namely, the amount by which the track width of the track #(M−1) is narrowed) exceeds the threshold narrowed amount as an evaluation amount and calculates a first cumulative amount obtained by accumulating the evaluation amounts in a first section. The first section includes a second section and a third section. The second section is a section for which writing in the circumferential direction of the track #M has been completed. The third section is a section to which data is to be written subsequent to the second section. Then, the controller 30 estimates the occurrence of a track error on the basis of a comparison between the first cumulative amount and a predetermined threshold value. The predetermined threshold value corresponds to the correction limit of the track error correction (referred to as a first track error threshold value). In a case where the first cumulative amount is smaller than the first track error threshold value, it can be estimated that no track error occurs even if writing is continued. In a case where the first cumulative amount is larger than the first track error threshold value, it can be estimated that a track error occurs in a case that writing is continued.

Note that the third section is a section from the tail of the second section to a next servo sector.

In the example illustrated in FIG. 7, a section from the head of the track #M to the servo sector #N of the track #M corresponds to the second section. A section from the servo sector #N to a servo sector #(N+1) of the track #M corresponds to the third section. A section from the head of the track #M to the servo sector #(N+1) of the track #M corresponds to the first section.

The calculation of accumulating the evaluation amounts in the first section is performed by calculating an evaluation amount at each of circumferential positions in the first section and then adding up the calculated evaluation amounts at the respective circumferential positions in the first section. Each of the circumferential positions is a circumferential position of a different data sector included in the track #(M−1) which is the adjacent track. Thus, the sum of the evaluation amounts at circumferential positions, where different data sectors of the adjacent track are adjacent to each other in the first section, is set as the first cumulative amount.

As described above, the controller 30 can acquire a PES each time when the magnetic head 22 passes over a servo sector. However, there is not always the case that only one data sector is present between servo sectors. Therefore, the controller 30 calculates the radial position of the magnetic head 22 at the circumferential positions of the respective data sectors of the adjacent track by interpolation based on a PES in each servo sector. Then, the controller 30 calculates the evaluation amounts at the circumferential positions of the respective data sectors of the adjacent track on the basis of the radial positions of the magnetic head 22 at the circumferential positions of the respective data sectors of the adjacent track.

The writing is completed in the second section, namely, the section from the head of the track #M to the servo sector #N of the track #M in the example illustrated in FIG. 7. For the section in which such writing is completed, the controller 30 calculates the evaluation amount at the circumferential positions of the respective data sectors of the adjacent track on the basis of a PES actually acquired for each servo sector by the magnetic head 22 at the time of writing or the like.

The third section, namely, the section from the servo sector #N to the servo sector #(N+1) of the track #M in the example illustrated in FIG. 7 is not yet written to. For such a section in which writing has not yet completed, the controller 30 estimates evaluation amounts at circumferential positions of respective data sectors of the adjacent track on the basis of one or more PESes obtained immediately before the magnetic head 22 passes over the section. In one example, the controller 30 estimates a PES to be acquired when the magnetic head 22 passes over the servo sector #(N+1) subsequent to the servo sector #N by extrapolation using the PES acquired when the magnetic head 22 passes over the servo sector #(N−1) and a PES acquired when the magnetic head 22 passes over the servo sector #N. Then, the controller 30 calculates the evaluation amounts at the circumferential positions of the respective data sectors of the adjacent track in the third section by using the PES acquired when passing over the servo sector #(N+1).

Note that the evaluation amounts calculated by the controller 30 are not necessarily evaluation amounts at circumferential positions of respective data sectors of the adjacent track. The controller 30 may calculate evaluation amounts at circumferential positions of respective data sectors included in a write target track 41 (for example, the track #M in FIG. 7) and use an amount obtained by accumulating the obtained evaluation amounts as the first cumulative amount. Alternatively, the controller 30 may calculate evaluation amounts at respective servo sectors included in a write target track 41 (for example, the track #M in FIG. 7) and use an amount obtained by accumulating the obtained evaluation amounts as the first cumulative amount. Hereinafter, in order to facilitate understanding, it is based on the premise that the controller 30 calculates evaluation amounts at respective servo sectors included in a write target track 41 and use an amount obtained by accumulating the obtained evaluation amounts as the first cumulative amount.

The amount obtained by accumulating evaluation amounts in the second section is referred to as a second cumulative amount. The first cumulative amount is obtained by adding an amount obtained by accumulating evaluation amounts in the third section to the second cumulative amount.

The PTS operation requires a relatively large amount of time. If the number of times of execution of the PTS operation is large when data is being written to one band region 130, the total time required for writing to the one band region 130 increases, and the performance of the write operation deteriorates.

In addition, when the PTS operation is performed in the write operation with respect to one track 41, an unused data sector is generated in the one track 41. However, the storage capacity of each band region 130 is predetermined. Therefore, when the PTS operation is executed multiple times while data is written in one band region 130, the number of data sectors in which data pieces can be written is depleted in the one band region 130, which may make it impossible to write user data corresponding to the storage capacity. In a case where it becomes impossible to write user data corresponding to the storage capacity, the controller 30 may re-execute the write operation for each band region 130.

Therefore, in the embodiment, in a case where it is estimated that a track error occurs by the track error estimation operation, the controller 30 suspends the write operation and waits for the magnetic disk 11 to make one rotation. Waiting for one rotation is referred to as a rotational delay. When the rotational delay is executed in a state where the write operation is interrupted, the controller 30 executes positioning (namely, tracking control) similar to that performed when the write operation has been executed. Then, when the magnetic head 22 passes over a point where the write operation has been interrupted, the controller 30 re-executes the track error estimation operation.

The track error estimation operation is merely based on an estimated value of the PES. The estimated value of the PES before the rotational delay is not necessarily equal to an estimated value of the PES after the rotational delay.

Figure 8:
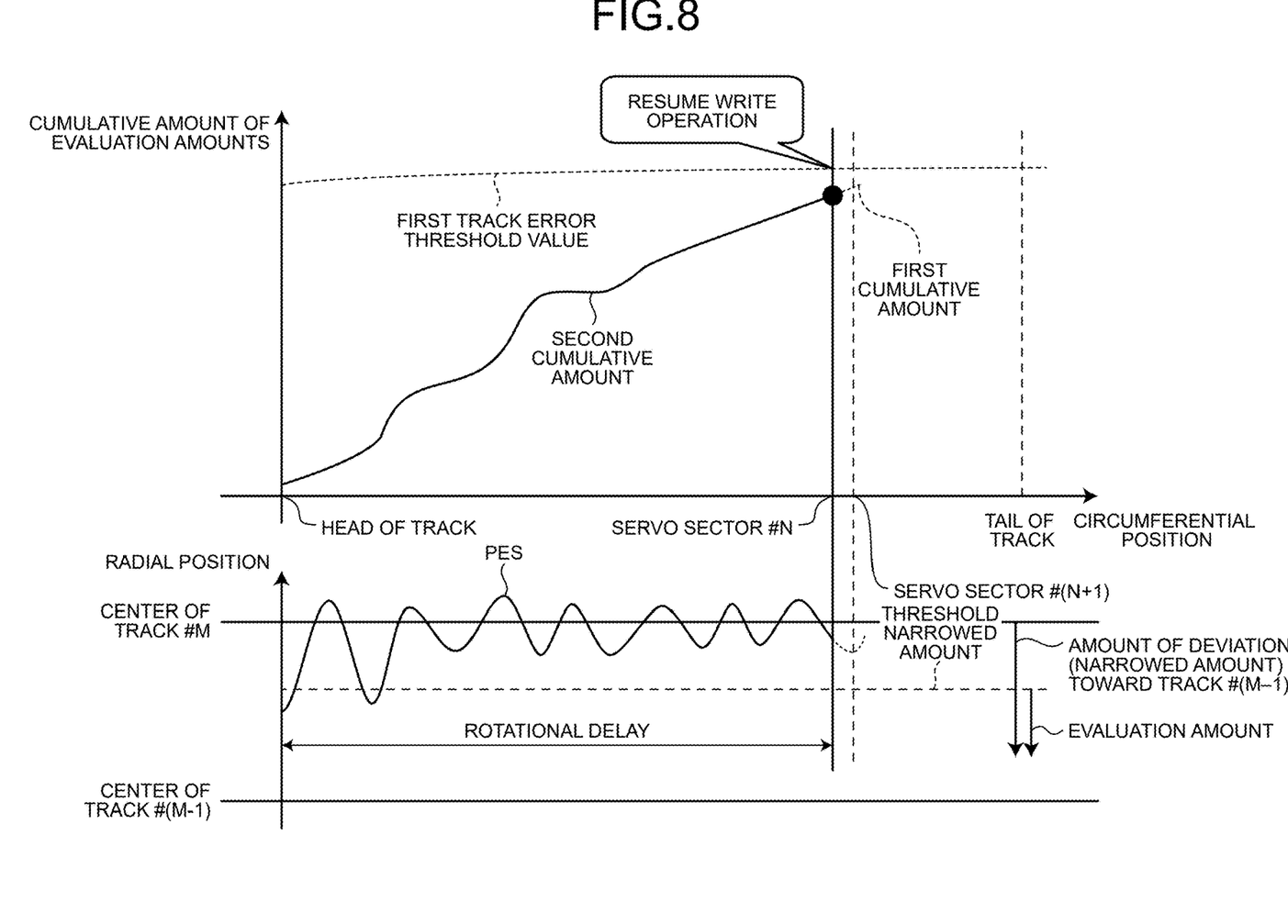
FIG. 8 is a diagram for describing an example of the operation of the magnetic disk according to the embodiment after a write operation is interrupted depending on a result of the track error estimation operation.

FIG. 8 is a diagram for describing an example of the operation of the magnetic disk 11 according to the embodiment after a write operation is interrupted depending on a result of a track error estimation operation.

It is assumed here that the magnetic head 22 vibrates due to an external factor during the write operation on the track #M and that the write operation is interrupted depending on the result of the track error estimation operation performed when the magnetic head 22 reaches the servo sector #N as illustrated in FIG. 7. Then, the controller 30 performs the rotational delay until the magnetic head 22 reaches the servo sector #N while continuing a tracking operation of bringing the magnetic head 22 closer to the center of the track #M. When the magnetic head 22 reaches the servo sector #N, the controller 30 re-executes the track error estimation operation.

The controller 30 also acquires a PES when the magnetic head 22 passes over each of the servo sector #(N−1) and the servo sector #N also during the rotational delay. In the track error estimation operation to be re-executed, the controller 30 estimates the PES in the servo sector #(N+1) on the basis of the PES acquired in the servo sector #(N−1) and the servo sector #N during the rotational delay and estimates the evaluation amount of the servo sector #(N+1).

In the example illustrated in FIG. 8, the vibration of the magnetic head 22 gradually decreases during the rotational delay. As a result, the evaluation amount in the servo sector #(N+1) is smaller than the evaluation amount in the servo sector #(N+1) illustrated in FIG. 7, and the first cumulative amount is smaller than the first track error threshold value. As a result, in the re-executed track error estimation operation, a result is obtained in which it is estimated that no track error occurs even if writing is continued. Depending on the result, the controller 30 resumes the write operation immediately after the magnetic head 22 passes over the servo sector #N.

As described above, in the embodiment, the rotational delay of the magnetic disk 11 is executed, whereas the number of times of execution of the PTS operation can be reduced. The time required for the rotational delay of the magnetic disk 11 is significantly shorter than the time required for the PTS operation. Therefore, a decrease in the performance of the write operation due to the execution of the PTS operation is suppressed. Thus, the performance of the write operation is improved. It is also made possible to prevent execution of the write operation for each band region 130 due to the writing of the user data corresponding to the storage capacity disabled through execution of the PTS operation.

Figure 9:
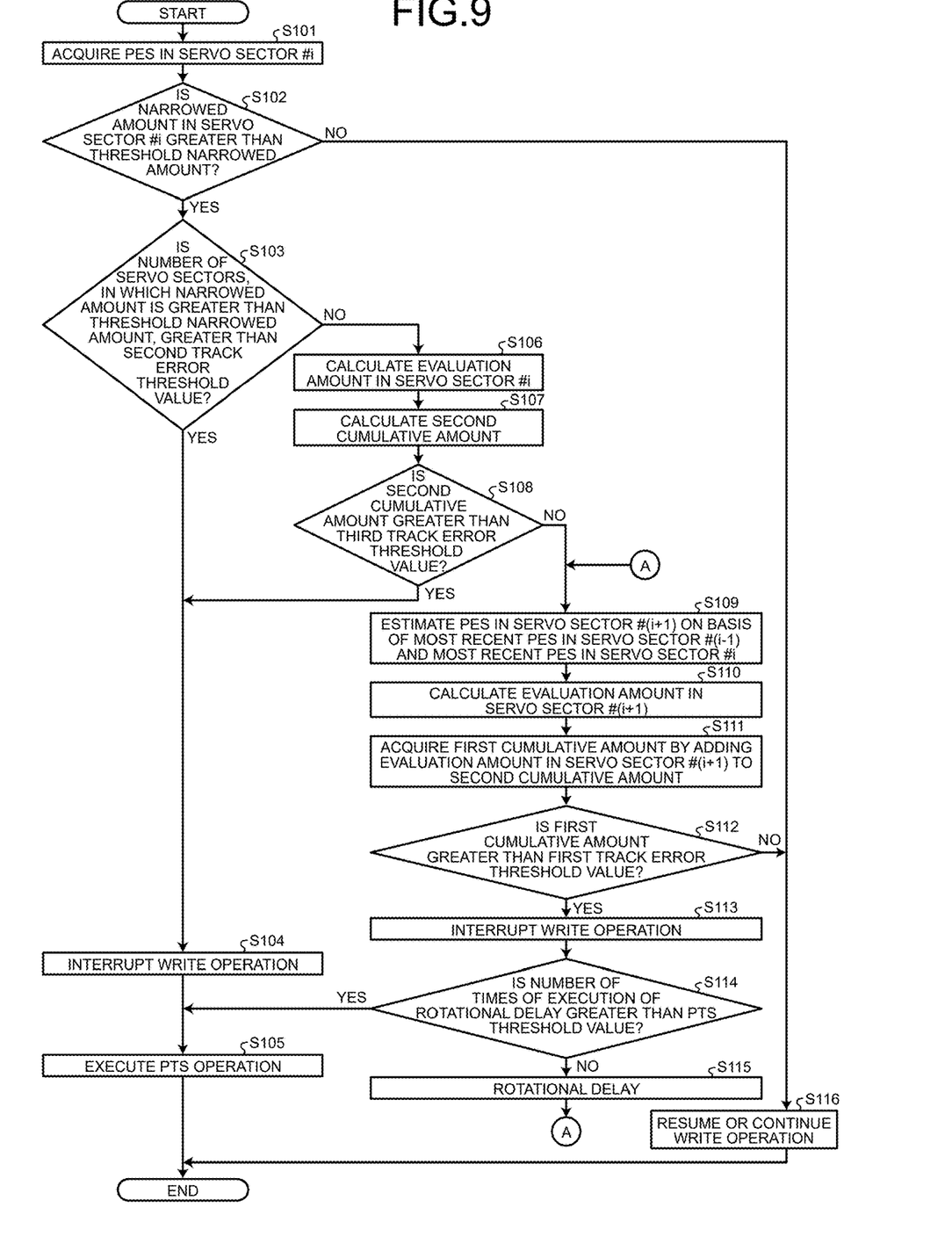
FIG. 9 is a flowchart illustrating an operation of the magnetic disk apparatus according to the embodiment.

FIG. 9 is a flowchart illustrating the operation of the magnetic disk apparatus 1 according to the embodiment. This drawing illustrates an operation performed when the magnetic head 22 passes over a servo sector (referred to as a servo sector #i) while the write operation on a track 41 is being executed. After starting the write operation, the controller 30 executes a series of operations illustrated in the drawing each time when the magnetic head 22 passes over a servo sector.

When the magnetic head 22 passes over the servo sector #i, the controller 30 acquires a PES in the servo sector #i on the basis of the servo information read from the servo sector #i (S101).

The controller 30 determines whether or not the narrowed amount in the servo sector #i is larger than the threshold narrowed amount (S102). The controller 30 calculates the narrowed amount in the servo sector #i on the basis of the PES in the servo sector #i and executes the processing of S102 by using the narrowed amount in the servo sector #i.

If the narrowed amount in the servo sector #i is larger than the threshold narrowed amount (S102: Yes), the controller 30 determines whether or not the number of servo sectors in which the narrowed amount is larger than the threshold narrowed amount among servo sectors included in a section from the track head to the servo sector #i is larger than a predetermined threshold value (referred to as a second track error threshold value) (S103).

As described above, whether or not a track error occurs is determined by a length of a section in the circumferential direction in which writing is performed in a state where the narrowed amount exceeds the threshold narrowed amount and an amount by which the narrowed amount exceeds the threshold narrowed amount. In the processing of S103, whether or not a track error occurs when the write operation is continued is estimated only on the basis of the length of the section in the circumferential direction in which writing is performed in the state where the narrowed amount exceeds the threshold narrowed amount.

The second track error threshold value corresponds to the correction limit of track error correction set with respect to the length of the section in the circumferential direction in which writing is performed in the state where the narrowed amount exceeds the threshold narrowed amount. In a case where the length of the section in the circumferential direction, in which writing is performed in the state where the narrowed amount exceeds the threshold narrowed amount, is larger than the second track error threshold value, it is estimated that a track error occurs when the write operation is continued. In a case where the length of the section in the circumferential direction, in which writing is performed in the state where the narrowed amount exceeds the threshold narrowed amount, is smaller than the second track error threshold value, it is estimated that no track error occurs even when the write operation is continued.

Note that the length of the section in the circumferential direction in which writing is performed in the state where the narrowed amount exceeds the threshold narrowed amount is represented by the number of data sectors included in the adjacent track. The length of the section in the circumferential direction in which writing is performed in the state where the narrowed amount exceeds the threshold narrowed amount may be represented by the number of data sectors included in a write target track or may be represented by the number of servo sectors. In this example, as an example, the length of the section in the circumferential direction in which writing is performed in the state where the narrowed amount exceeds the threshold narrowed amount is represented by the number of servo sectors.

If the number of servo sectors having a narrowed amount larger than the threshold narrowed amount is larger than the second track error threshold value (S103: Yes), the controller 30 immediately stops the write operation (S104). Then, the controller 30 executes the PTS operation (S105), and the operation ends. Thus, the write operation is not performed on an area from the servo sector #i to the tail of the track.

If the number of servo sectors, whose narrowed amount is larger than the threshold narrowed amount, is not larger than the second track error threshold value (S103: No), the controller 30 calculates the evaluation amount in the servo sector #i on the basis of the PES in the servo sector #i (S106). The controller 30 calculates the evaluation value by subtracting the threshold narrowed amount from the narrowed amount in the servo sector #i. In a case where the value obtained by subtracting the threshold narrowed amount from the narrowed amount is a negative value, the controller 30 sets the narrowed amount to 0.

Subsequently, the controller 30 calculates the second cumulative amount, namely, an amount obtained by accumulating evaluation values in the section from the track head to the servo sector #i (S107). When the magnetic head 22 passes over the servo sector #(i−1), the controller 30 calculates the second cumulative amount for the section from the track head to the servo sector #(i−1) by the processing of S107. Therefore, the controller 30 adds the evaluation amount in the servo sector #i obtained by the processing of S106 to the second cumulative amount in the section from the track head to the servo sector #(i−1), thereby acquiring the second cumulative amount in the section from the track head to the servo sector #i. Note that the method of calculating the second cumulative amount is not limited to the above.

The controller 30 determines whether or not the second cumulative amount is larger than the third track error threshold value (S108). In S108, a determination operation similar to the track error estimation operation is performed on the basis of the PES actually acquired during the write operation. The third track error threshold value may be the same as or different from the first track error threshold value.

If the second cumulative amount is larger than the third track error threshold value (S108: Yes), the control shifts to S104.

If the second cumulative amount is not larger than the third track error threshold value (S108: No), the controller 30 estimates the PES in the servo sector #(i+1) on the basis of the most recent PES in the servo sector #(i−1) and the most recent PES in the servo sector #i (S109). The most recent PES refers to the most recently obtained PES among PESes obtained during the write operation and PESes obtained during the rotational delay.

The controller 30 calculates the evaluation amount in the servo sector #(i+1) on the basis of the estimated value of the PES in the servo sector #(i+1) (S110). The method of calculating the evaluation amount is the same as that in S106.

The controller 30 acquires the first cumulative amount by adding the evaluation amount in the servo sector #(i+1) to the second cumulative amount (S111). Then, the controller 30 determines whether or not the first cumulative amount is larger than the first track error threshold value (S112).

The operations from S109 to S112 correspond to the track error estimation operation described above.

If the first cumulative amount is larger than the first track error threshold value (S112: Yes), the controller 30 interrupts the write operation (S113). Then, the controller 30 determines whether or not the number of times of execution of rotational delay is larger than a predetermined threshold (referred to as a PTS threshold value) (S114).

As described above, the time required for the rotational delay is significantly shorter than the time required for the PTS operation. However, when the rotational delay is executed many times in the servo sector #i, the total time required for the many times of rotational delay may exceed the time required for the PTS operation. In order to prevent the total time required for the rotational delay from exceeding the time required for the PTS operation, an upper limit is set for the number of times of execution of rotational delay. The PTS threshold value defines the upper limit of the number of times of execution of rotational delay. An integer larger than or equal to 1 is preset as the PTS threshold value.

In S114, the count value of the number of times of rotational delay executed depending on the result of the track error estimation operation in the servo sector #i is compared with the PTS threshold value. The number of times compared with the PTS threshold value is not limited to the above. In one example, a count value of the total number of times of rotational delay performed in one track 41 may be compared with the PTS threshold value.

If the number of times of execution of rotational delay is larger than the PTS threshold value (S114: Yes), the rotational delay is not executed, and the control shifts to S105.

If the number of times of execution of rotational delay is not larger than the PTS threshold value (S114: No), the controller 30 executes rotational delay (S115). Then, when the magnetic head 22 passes over the servo sector #i again, the control shifts to S109, and the track error estimation operation from S109 to S112 is executed again.

If the narrowed amount in the servo sector #i is not larger than the threshold narrowed amount (S102: No) or if the first cumulative amount is not larger than the first track error threshold value (S112: No), the controller 30 resumes or continues the write operation (S116), and the operation performed when the magnetic head 22 passes over the servo sector #i ends.

In the above description, in a case where the narrowed amount in the servo sector #i is equal to the threshold narrowed amount in the processing of S102, the control shifts to S116. In the case where the narrowed amount in the servo sector #i is equal to the threshold narrowed amount, the control may shift to S103 instead of S116.

In the above description, in a case where the second cumulative amount is equal to the third track error threshold value in the processing of S108, the control shifts to S109. In the case where the second cumulative amount is equal to the third track error threshold value, the control may shift to S104 instead of S109.

In the above description, in a case where the first cumulative amount is equal to the first track error threshold value in the processing of S112, the control shifts to S116. Alternatively, the control may shift to S113 instead of S116 in the case where the first cumulative amount is equal to the first track error threshold value.

As described above, according to the embodiment, the controller 30 executes the track error estimation operation when the magnetic head 22 passes over a servo sector (referred to as a first servo sector) during the write operation. The track error estimation operation is an operation to calculate the first cumulative amount obtained by accumulating evaluation amounts, for the first section, each corresponding to an amount by which the width of an adjacent track is narrowed by the write operation and to determine whether the first cumulative amount is smaller than or larger than the first track error threshold value corresponding to the correction limit of the track error correction. The first section includes the second section (for example, the section from the track head to the servo sector #N in FIG. 7) that is a section of a write target track 41 in which writing of data in the circumferential direction is completed and a third section (for example, the section from the servo sector #N to the servo sector #(N+1) in FIG. 7) that is a section in which data is written subsequent to the second section in the circumferential direction of the write target track. The controller 30 interrupts the write operation in response to determining that the first cumulative amount is larger than the first track error threshold value. After the write operation is interrupted, the controller 30 executes the rotational delay of the magnetic disk 11 and re-executes the track error estimation operation as the magnetic head 22 passes over the first servo sector again. The controller 30 resumes the write operation in response to determining, by the re-executed track error estimation operation, that the first cumulative amount is smaller than the first track error threshold value.

Therefore, although the rotational delay of the magnetic disk 11 is executed, the number of times of execution of the PTS operation can be reduced. As a result, the performance of the write operation is improved.

In addition, according to the embodiment, the controller 30 calculates the second cumulative amount obtained by accumulating evaluation amounts in the second section on the basis of the PES acquired during execution of the write operation from respective servo sectors included in the second section. In addition, the controller 30 estimates an evaluation amount in the third section on the basis of the PES in the first servo sector and the PES in a servo sector over which the magnetic head 22 passes immediately before the first servo sector (referred to as a second servo sector). Then, the controller 30 adds the evaluation amount in the third section to the second cumulative amount to acquire the first cumulative amount.

In this manner, the controller 30 acquires the evaluation amount in the third section by the estimation.

In addition, according to the embodiment, the controller 30 acquires the PES in the first servo sector and the PES in the second servo sector during the rotational delay after the interruption of the write operation and estimates the evaluation amount in the third section by using the PES in the first servo sector and the PES in the second servo sector acquired during the rotational delay after the interruption of the write operation.

Therefore, when the vibration of the magnetic head 22 stops during the rotational delay, in the track error estimation operation re-executed when the rotational delay is ended, there are cases where a result is obtained in which it is estimated that no track error occurs even if writing is continued. Thus, it is possible to resume the write operation after the rotational delay.

According to the embodiment, the controller 30 uses, as the evaluation amount in the third section, the evaluation amount in a servo sector that the magnetic head 22 passes immediately after the first servo sector.

In addition, according to the embodiment, an evaluation amount is an amount obtained by subtracting the threshold narrowed amount from the amount of deviation of the magnetic head 22 from the center of a write target track 41 toward an adjacent track.

Note that, as described above, the threshold narrowed amount is larger than or equal to 0 and is less than or equal to a design value of the track width. The threshold narrowed amount is determined by a designer.

Moreover, according to the embodiment, in a case where a result of the re-executed track error estimation operation indicates that the first cumulative amount is larger than the first track error estimation operation, and the number of times of execution of the rotational delay is not larger than the PTS threshold value, the controller 30 further executes the rotational delay and re-executes the track error estimation operation as the magnetic head 22 passes over the first servo sector. In a case where a result of the re-executed track error estimation operation indicates that the first cumulative amount is larger than the first track error threshold value and the number of times of execution of the rotational delay is larger than the PTS threshold value, the controller 30 executes the PTS operation.

Therefore, it is possible to prevent the total time required for the rotational delay that is executed multiple times from exceeding the time required for the PTS operation.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk including tracks on which multiple servo sectors storing servo information are arranged at intervals in a circumferential direction, the multiple servo sectors including a first track and a second track adjacent to the first track in a radial direction, the second track being subjected to writing before the first track is, the first track and the second track each including data sectors, the data sectors including a data sector in which an error correction code is stored to perform error correction on the corresponding first or second track;
a magnetic head configured to write data and read data to and from the magnetic disk; and
a controller configured to
read servo information when the magnetic head passes over each of the multiple servo sectors and execute, based on the read servo information, a write operation on the first track while executing positioning of the magnetic head on the first track,
execute, during the write operation, a determination operation when the magnetic head passes over a first servo sector being one of the multiple servo sectors, the determination operation being executed by: calculating a first cumulative amount obtained by accumulating, for a first section, evaluation amounts each corresponding to an amount by which a width of the second track is narrowed due to the write operation, and determining whether the first cumulative amount is smaller or larger than a first threshold value corresponding to a correction limit of the error correction, the first section including a second section and a third section, the second section being a section in which writing of data in a circumferential direction of the first track is completed, the third section being a section in which data is written subsequent to the second section in the circumferential direction of the first track,
interrupt the write operation in response to determining, by the determination operation, that the first cumulative amount is larger than the first threshold value,
execute, after the write operation is interrupted, a rotational delay of the magnetic disk and re-execute the determination operation when the magnetic head passes over the first servo sector again, and
resume the write operation in response to determining, by the re-executed determination operation, that the first cumulative amount is smaller than the first threshold value.

2. The magnetic disk apparatus according to claim 1, wherein the controller is configured to
calculate a second cumulative amount obtained by accumulating the evaluation amounts for the second section, the second cumulative amount being calculated based on servo information read from each servo sector included in the second section out of the multiple servo sectors during the write operation,
estimate the evaluation amount in the third section based on servo information read from the first servo sector and servo information read from a second servo sector, the second servo sector being a servo sector over which the magnetic head passes immediately before passing over the first servo sector, and
acquire the first cumulative amount by adding the estimated evaluation amount in the third section to the second cumulative amount.

3. The magnetic disk apparatus according to claim 2, wherein the controller is configured to
read servo information from the first servo sector and read servo information from the second servo sector during execution of the rotational delay of the magnetic disk, and,
in the re-executed determination operation, estimate the evaluation amount in the third section by using the servo information read from the first servo sector during execution of the rotational delay of the magnetic disk and the servo information read from the second servo sector during execution of the rotational delay of the magnetic disk.

4. The magnetic disk apparatus according to claim 3, wherein the evaluation amount in the third section is the evaluation amount in a servo sector over which the magnetic head passes immediately after passing over the first servo sector.

5. The magnetic disk apparatus according to claim 1, wherein the evaluation amount is an amount obtained by subtracting a second threshold value from an amount of deviation of the magnetic head from a center of the first track toward the second track.

6. The magnetic disk apparatus according to claim 1, wherein the controller is configured to,
   in a case where the first cumulative amount is determined, by the re-executed determination operation, to be larger than the first threshold value and a number of times the rotational delay of the magnetic disk has been executed is not larger than a second threshold value, additionally execute a rotational delay of the magnetic disk and re-execute the determination operation when the magnetic head passing over the first servo sector, and,
   in a case where the first cumulative amount is determined, by the re-executed determination operation, to be larger than the first threshold value and the number of times the rotational delay of the magnetic disk has been executed is larger than the second threshold value, write data at least not yet written to the first track to a position different from the first track.

7. The magnetic disk apparatus according to claim 2, wherein the controller is configured to,
   in a case where the first cumulative amount is determined, by the re-executed determination operation, to be larger than the first threshold value and a number of times the rotational delay of the magnetic disk has been executed is not larger than a second threshold value, additionally execute a rotational delay of the magnetic disk and re-execute the determination operation when the magnetic head passing over the first servo sector, and,
   in a case where the first cumulative amount is determined, by the re-executed determination operation, to be larger than the first threshold value and the number of times the rotational delay of the magnetic disk has been executed is larger than the second threshold value, write data at least not yet written to the first track to a position different from the first track.

8. The magnetic disk apparatus according to claim 3, wherein the controller is configured to,
   in a case where the first cumulative amount is determined, by the re-executed determination operation, to be larger than the first threshold value and a number of times the rotational delay of the magnetic disk has been executed is not larger than a second threshold value, additionally execute a rotational delay of the magnetic disk and re-execute the determination operation when the magnetic head passing over the first servo sector, and,
   in a case where the first cumulative amount is determined, by the re-executed determination operation, to be larger than the first threshold value and the number of times the rotational delay of the magnetic disk has been executed is larger than the second threshold value, write data at least not yet written to the first track to a position different from the first track.

9. The magnetic disk apparatus according to claim 4, wherein the controller is configured to,
   in a case where the first cumulative amount is determined, by the re-executed determination operation, to be larger than the first threshold value and a number of times the rotational delay of the magnetic disk has been executed is not larger than a second threshold value, additionally execute a rotational delay of the magnetic disk and re-execute the determination operation when the magnetic head passing over the first servo sector, and,
   in a case where the first cumulative amount is determined, by the re-executed determination operation, to be larger than the first threshold value and the number of times the rotational delay of the magnetic disk has been executed is larger than the second threshold value, write data at least not yet written to the first track to a position different from the first track.

10. The magnetic disk apparatus according to claim 5, wherein the controller is configured to,
   in a case where the first cumulative amount is determined, by the re-executed determination operation, to be larger than the first threshold value and a number of times the rotational delay of the magnetic disk has been executed is not larger than a second threshold value, additionally execute a rotational delay of the magnetic disk and re-execute the determination operation when the magnetic head passing over the first servo sector, and,
   in a case where the first cumulative amount is determined, by the re-executed determination operation, to be larger than the first threshold value and the number of times the rotational delay of the magnetic disk has been executed is larger than the second threshold value, write data at least not yet written to the first track to a position different from the first track.

11. A method of controlling a magnetic disk apparatus including a magnetic disk and a magnetic head, the magnetic disk including tracks on which multiple servo sectors storing servo information are arranged at intervals in a circumferential direction, the multiple servo sectors including a first track and a second track adjacent to the first track in a radial direction, the second track being subjected to writing before the first track is, the first track and the second track each including data sectors, the data sectors including a data sector in which an error correction code is stored to perform error correction on the corresponding first or second track, the method comprising:
   reading servo information when the magnetic head passes over each of the multiple servo sectors and executing, based on the read servo information, a write operation on the first track while executing positioning of the magnetic head on the first track;
   executing, during the write operation, a determination operation when the magnetic head passes over a first servo sector being one of the multiple servo sectors, the determination operation being executed by: calculating a first cumulative amount obtained by accumulating, for a first section, evaluation amounts each corresponding to an amount by which a width of the second track is narrowed due to the write operation, and determining whether the first cumulative amount is smaller or larger than a first threshold value corresponding to a correction limit of the error correction, the first section including a second section and a third section, the second section being a section in which writing of data in a circumferential direction of the first track is completed, the third section being a section in which data is written subsequent to the second section in the circumferential direction of the first track;

interrupting the write operation in response to determining, by the determination operation, that the first cumulative amount is larger than the first threshold value;

executing, after the write operation is interrupted, a rotational delay of the magnetic disk and re-executing the determination operation when the magnetic head passes over the first servo sector again; and resuming the write operation in response to determining, by the re-executed determination operation, that the first cumulative amount is smaller than the first threshold value.

12. The method according to claim 11, further comprising:

calculating a second cumulative amount obtained by accumulating the evaluation amounts for the second section, the second cumulative amount being calculated based on servo information read from each servo sector included in the second section out of the multiple servo sectors during the write operation;

estimating the evaluation amount in the third section based on servo information read from the first servo sector and servo information read from a second servo sector, the second servo sector being a servo sector over which the magnetic head passes immediately before passing over the first servo sector; and acquiring the first cumulative amount by adding the estimated evaluation amount in the third section to the second cumulative amount.

13. The method according to claim 12, further comprising:

reading servo information from the first servo sector and reading servo information from the second servo sector during execution of the rotational delay of the magnetic disk; and, in the re-executed determination operation, estimating the evaluation amount in the third section by using the servo information read from the first servo sector during execution of the rotational delay of the magnetic disk and the servo information read from the second servo sector during execution of the rotational delay of the magnetic disk.

14. The method according to claim 13, wherein the evaluation amount in the third section is the evaluation amount in a servo sector over which the magnetic head passes immediately after passing over the first servo sector.

15. The method according to claim 11, wherein the evaluation amount is an amount obtained by subtracting a second threshold value from an amount of deviation of the magnetic head from a center of the first track toward the second track.

16. The method according to claim 11, further comprising:

in a case where the first cumulative amount is determined, by the re-executed determination operation, to be larger than the first threshold value and a number of times the rotational delay of the magnetic disk has been executed is not larger than a second threshold value, additionally executing a rotational delay of the magnetic disk and re-executing the determination operation when the magnetic head passing over the first servo sector; and, in a case where the first cumulative amount is determined, by the re-executed determination operation, to be larger than the first threshold value and the number of times the rotational delay of the magnetic disk has been executed is larger than the second threshold value, writing data at least not yet written to the first track to a position different from the first track.

17. The method according to claim 12, further comprising:

in a case where the first cumulative amount is determined, by the re-executed determination operation, to be larger than the first threshold value and a number of times the rotational delay of the magnetic disk has been executed is not larger than a second threshold value, additionally executing a rotational delay of the magnetic disk and re-executing the determination operation when the magnetic head passing over the first servo sector; and, in a case where the first cumulative amount is determined, by the re-executed determination operation, to be larger than the first threshold value and the number of times the rotational delay of the magnetic disk has been executed is larger than the second threshold value, writing data at least not yet written to the first track to a position different from the first track.

18. The method according to claim 13, further comprising:

in a case where the first cumulative amount is determined, by the re-executed determination operation, to be larger than the first threshold value and a number of times the rotational delay of the magnetic disk has been executed is not larger than a second threshold value, additionally executing a rotational delay of the magnetic disk and re-executing the determination operation when the magnetic head passing over the first servo sector; and, in a case where the first cumulative amount is determined, by the re-executed determination operation, to be larger than the first threshold value and the number of times the rotational delay of the magnetic disk has been executed is larger than the second threshold value, writing data at least not yet written to the first track to a position different from the first track.

19. The method according to claim 14, further comprising:

in a case where the first cumulative amount is determined, by the re-executed determination operation, to be larger than the first threshold value and a number of times the rotational delay of the magnetic disk has been executed is not larger than a second threshold value, additionally executing a rotational delay of the magnetic disk and re-executing the determination operation when the magnetic head passing over the first servo sector; and, in a case where the first cumulative amount is determined, by the re-executed determination operation, to be larger than the first threshold value and the number of times the rotational delay of the magnetic disk has been executed is larger than the second threshold value, writing data at least not yet written to the first track to a position different from the first track.

20. The method according to claim 15, further comprising:

in a case where the first cumulative amount is determined, by the re-executed determination operation, to be larger than the first threshold value and a number of times the rotational delay of the magnetic disk has been executed is not larger than a second threshold value, additionally executing a rotational delay of the magnetic disk and re-executing the determination operation when the magnetic head passing over the first servo sector; and, in a case where the first cumulative amount is determined, by the re-executed determination operation, to be larger than the first threshold value and the number of times the rotational delay of the magnetic disk has been executed is larger than the second threshold value, writing data at least not yet written to the first track to a position different from the first track.

* * * * *